United States Patent [19]

Washio

[11] Patent Number: 5,295,185
[45] Date of Patent: Mar. 15, 1994

[54] RINGING SIGNAL GENERATION CIRCUIT WITH PROTECTION AGAINST OVERVOLTAGE

[75] Inventor: Toshihumi Washio, Kawasaki, Japan
[73] Assignee: Fujitsu Limited, Kawasaki, Japan
[21] Appl. No.: 533,854
[22] Filed: Jun. 6, 1990
[30] Foreign Application Priority Data
Jun. 8, 1989 [JP] Japan ................................ 1-145963
[51] Int. Cl.⁵ ............................................ H04M 3/04
[52] U.S. Cl. ................................ 379/331; 379/252; 379/253; 379/418; 379/412
[58] Field of Search ............... 379/252, 253, 254, 255, 379/418, 331, 412; 363/19, 56, 91; 361/91

[56] References Cited

U.S. PATENT DOCUMENTS

| | | | |
|---|---|---|---|
| 3,155,777 | 11/1964 | Owen | 379/253 |
| 3,229,040 | 1/1966 | Drake et al. | 379/331 |
| 3,665,109 | 5/1972 | Shaffer | 379/331 |
| 3,723,662 | 3/1973 | Macrander | 379/253 |
| 4,309,736 | 1/1982 | Lissillous | 379/331 |
| 4,914,560 | 4/1990 | Oh et al. | 363/19 |
| 5,003,588 | 3/1991 | Wingerath | 379/331 |

Primary Examiner—James L. Dwyer
Assistant Examiner—Magdy W. Shehata
Attorney, Agent, or Firm—Staas & Halsey

[57] ABSTRACT

A ringing signal generation circuit contains a direct current power source, a transformer, a control transistor, a rectifying and smoothing circuit, an invertor circuit, and an invertor controlling circuit. The direct current power source generates a direct current voltage. The transformer contains a primary winding and a base-driving winding in a primary side, and a secondary winding in a secondary side. The control transistor is connected in series to the primary winding and the direct current power source, and controls a current flowing in the primary winding. The rectifying and smoothing circuit rectifies and smooths a current generated in the secondary winding. The invertor circuit for converting a direct current output of the rectifying and smoothing circuit into an alternating current. The invertor controlling circuit controls the invertor circuit. Further, an overvoltage detecting circuit is provided for detecting an overvoltage in the secondary winding; and a current supply stopping circuit is provided for stopping a supply of the current to the primary winding.

10 Claims, 2 Drawing Sheets

RINGING SIGNAL GENERATION CIRCUIT WITH PROTECTION AGAINST OVERVOLTAGE

BACKGROUND OF THE INVENTION (1) Field of the Invention

The present invention relates to a ringing signal generation circuit having a function to protect against an overvoltage in the generated ringing signal.

In telephone exchange systems, ringing signal number circuits are provided for generating a ringing signal to inform a called party that a call is incoming, by a ringing tone. The ringing signal is sent to a telephone set at the called party through a subscriber circuit and a telephone line.

Usually, the ringing signal generation circuit is constructed using a DC-DC converter such as a ringing choke converter, and an invertor to generate a high voltage alternating signal from a low voltage direct current voltage source.

(2) Description of the Related Art

FIG. 1 shows a conventional construction of a ringing signal generation circuit. In FIG. 1, reference numerals 1, 7, 8, 11, 12, 30, 31, 34, 35, 36, 37, 39, 41, 42, and 44 each denote a resistor, 2 denotes a primary winding, 3 denotes a direct current (DC) voltage source, 4 denotes a switching transistor, 6 denotes a base-current control transistor, 5, 9, 17, 20, 24, 25, and 38 each denote a diode, 13, 18, 21, 23, 27, and 43 each denote a capacitor, 14 denotes a base-driving winding, 15 denotes a transformer, 16 and 26 each denote an additional winding, 19 and 22 each denote a secondary winding, 28 and 34 each denote an output control transistor, 29 and 33 each denote a phototransistor, 40 and 46 each denote a transistor, 47 denotes a relay, 48 denotes an oscillator, 49 and 50 each denote a photodiode, 60 denotes a power source of a control circuit, and 70 denotes a relay switch.

The primary winding 2, the direct current (DC) voltage source 3, the resistors 1, 7, 8, 11, and 12, the switching transistor 4, the base-current control transistor 6, the diodes 5 and 9, the Zener diode 10, the capacitor 13, and the base-driving winding 14, constitute a primary side of a ringing choke converter.

In the secondary side of the transformer 15, two secondary windings 19 and 22 and two additional windings 6 and 26 are provided. To each of the windings 16, 19, 22, and 26 in the secondary side, a rectifying and smoothing circuit comprised of a diode (17, 20, 24, or 25) and a capacitor (18, 21, 23, or 27) is connected.

In the secondary side, the secondary winding 19 and the rectifying and smoothing circuit (20, 21) which is connected to the secondary winding 19, are provided to supply the output therefrom for generating a positive-voltage component of the ringing signal, and the secondary winding 22 and the rectifying and smoothing circuit (23, 24) which is connected to the secondary winding 22, are provided to supply the output therefrom for generating a negative voltage component of the ringing signal. To generate the AC ringing signal, an invertor circuit is provided in the output side of the rectifying and smoothing circuits (20, 21) and (24, 23). The invertor circuit is comprised of the output control transistors 28 and 32. The output control transistors 28 and 32 are respectively controlled by the phototransistors 29 and 33, and the phototransistors 29 and 33 respectively receive a power supply from the additional windings 16 and 26 through the rectifying and smoothing circuits (17, 18) and (25, 24).

The phototransistors 29 and 33 are respectively driven by light emitted from the photodiodes 50 and 49 in a control circuit, and the phototransistors 50 and 49 alternatively emits light responding to positive and negative voltage components of an analog AC output current having a frequency of 20 Hz from the oscillator 48.

The ringing choke converter is known as a self-oscillating DC-DC converter which can be constructed by a small number of circuit components and at a low cost. However, the operation of the ringing choke converter depends much on the characteristics of the circuit components such as the switching transistor, the Zener diode, the capacitor and the like.

For example, the output voltage of the ringing signal generation circuit may exceed much over a tolerable range of the ringing signal (overvoltage) due to a deterioration caused by aging of one or more circuit components. The overvoltage in the ringing signal may cause a burning of a circuit component in the path of the ringing signal in the subscriber circuit.

The construction comprised of the resistors 39, 37, 41, 42, and 44, the capacitor 43, the Zener diode 45, the transistors 40 and 46, the relay circuit, and the relay switch 70, is provided for generating an alarm signal when an overvoltage is detected in the output of the ringing signal. The above-mentioned high-voltage-side output terminal of the rectifying and smoothing circuit (20, 21) is also connected to an end of a series connection of the resistor 39, the three diodes 38, and the resistor 37 (an end of the resistor 39) to monitor an overvoltage in the output of the rectifying and smoothing circuit (20, 21). The connecting point between the diodes 38 and the resistor 37 is connected to the base terminal of the transistor 40. The collector of the transistor 40 is connected to an end of the resistor 41, the other end of the resistor 41 is connected to an end of the capacitor 43, and the other end of the capacitor 43 is connected to the emitter of the transistor 40. The high-voltage-side terminal of the capacitor 43 is connected to the base terminal of the transistor 46 through the Zener diode 45. The transistor 46 is connected in series in a circuit for applying power to the relay circuit 47 which is provided for controlling an overvoltage alarm. When the voltage of the high-voltage-side output terminal of the rectifying and smoothing circuit (20, 21) is normal, the voltage of the connecting point between the diodes 38 and the resistor 37, i.e., the voltage of the base of the transistor 40 is low. Therefore, the transistor 40 is OFF, the voltage of the high-voltage-side terminal of the capacitor 43 is high, and the current flows through the Zener diode 45 to the base of the transistor 46. Receiving the current to the base, the transistor 46 is normally ON, a current from the voltage source 60 flows in the relay circuit 47, and correspondingly the relay switch 70 is normally OFF. When the voltage of the high-voltage-side output terminal of the rectifying and smoothing circuit (20, 21) exceeds a predetermined voltage level, e.g., 170 V, the voltage of the connecting point between the diodes 38 and the resistor 37, i.e., the voltage of the base of the transistor 40 becomes high. Therefore, the transistor 40 becomes ON, the voltage of the high-voltage-side terminal of the capacitor 43 becomes low, and the current does not flow through the Zener diode 45 to the base of the transistor 46. Therefore, the transistor 46 becomes OFF, the current does not flows in the relay circuit 47, and correspondingly the relay switch 70 becomes ON, i.e., an alarm signal is output.

However, in the above construction, an overvoltage is detected and is informed to the operator as an alarm signal, but the overvoltage itself is not controlled, and therefore, there remains a risk that the circuit component in the path of the ringing signal in the subscriber circuit, is damaged.

SUMMARY OF THE INVENTION

An object of the present invention is to provide a ringing signal generation circuit wherein an overvoltage in the output can be safely prevented.

According to the present invention, there is provided a ringing signal generation circuit comprising: a direct current power source for generating a direct current voltage; a transformer, comprising a primary winding and a base-driving winding in a primary side, and a secondary winding in a secondary side; a control transistor, connected in series to the primary winding and the direct current a power source, for controlling a current flowing in the primary winding; a rectifying and smoothing circuit for rectifying and smoothing a current generated in the secondary winding; an invertor circuit for converting a direct current output of the rectifying and smoothing circuit into an alternating current; an invertor controlling circuit for controlling the invertor circuit; an overvoltage detecting circuit for detecting an overvoltage in the secondary winding; and a current supply stopping circuit for stopping a supply of the current to the primary winding.

DESCRIPTION OF THE PREFERRED EMBODIMENTS

Figure 1:
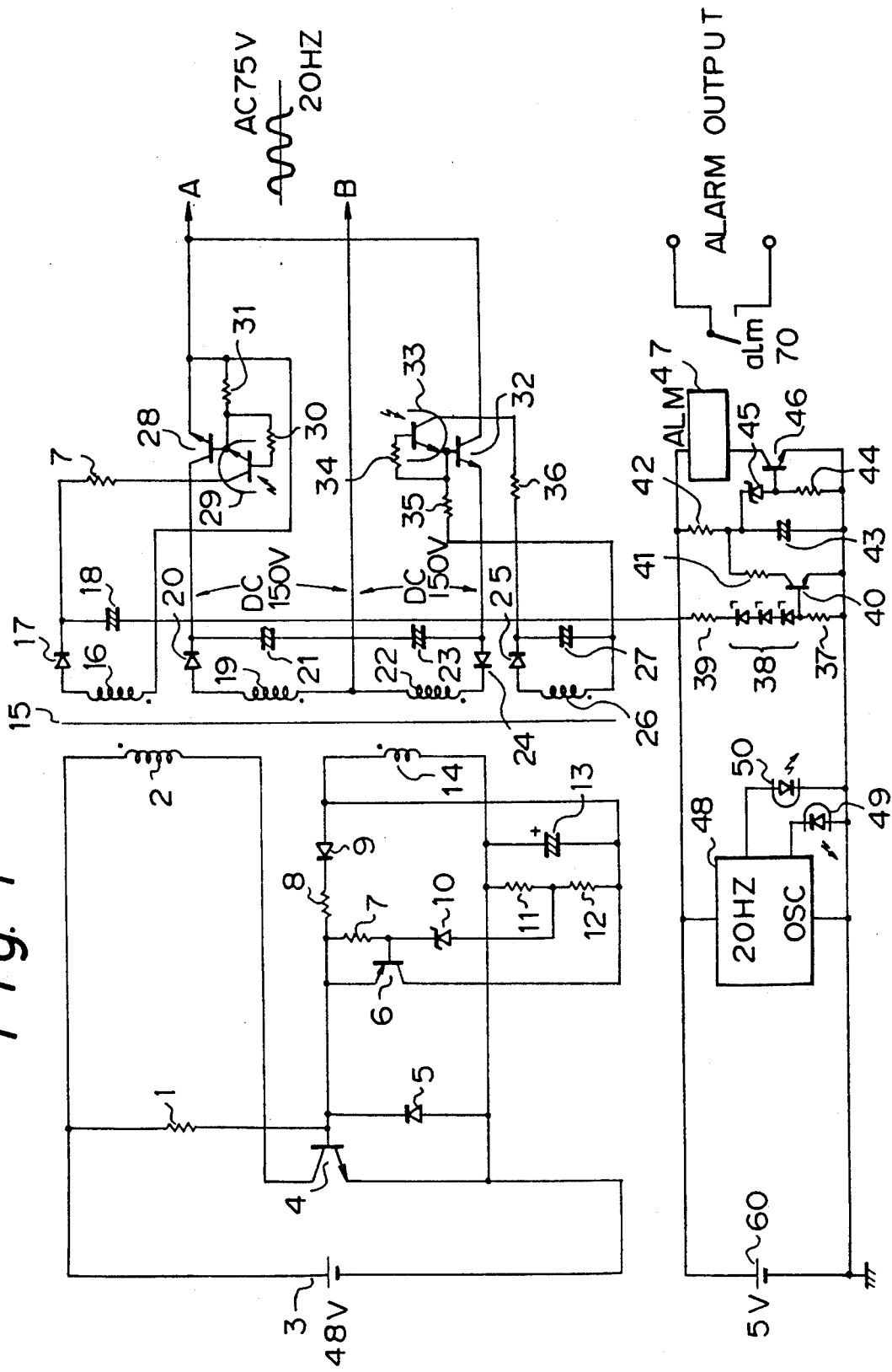
FIG. 1 shows a conventional construction of a ringing signal generation circuit.
Figure 2:
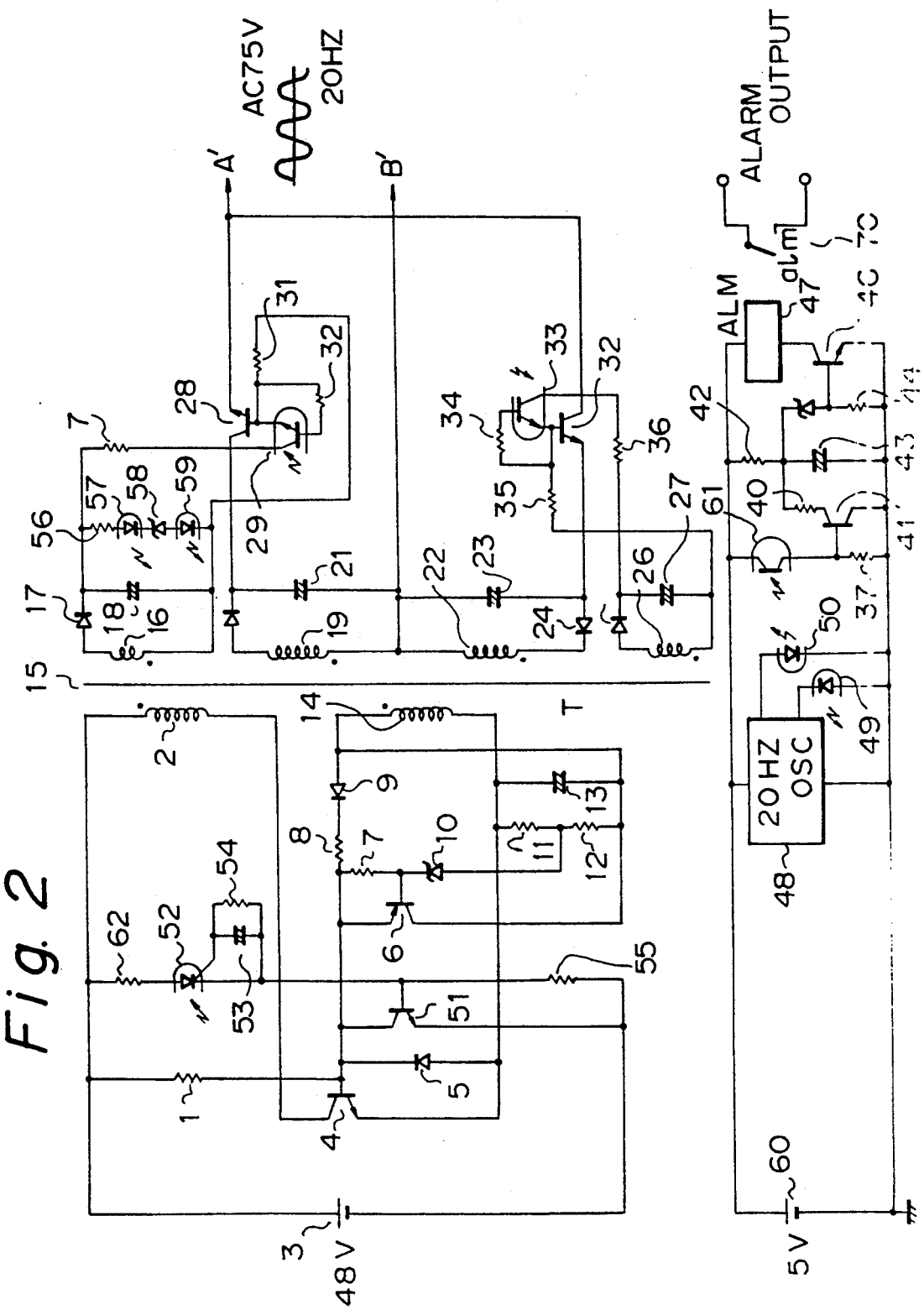
FIG. 2 shows a construction of a ringing signal generation circuit in the embodiment of the present invention.

FIG. 2 shows a construction of the ringing signal generation circuit in the embodiment of the present invention. In FIG. 2, the same reference numerals as FIG. 1 each denote the same component as FIG. 1. Further, reference numeral 51 denotes a transistor, 52 denotes a photothyristor, 53 denotes a capacitor, 54, 55, 56, and 62 each denote a resistor, 57 and 59 each denote a photodiode, 58 denotes a Zener diode, 61 denotes a phototransistor.

Similar to the construction of FIG. 1, the primary winding 2, the direct current (DC) voltage source 3, the resistors 1, 7, 8, 11, and 12, the switching transistor 4, the base-current control transistor 6, the diodes 5 and 9, the Zener diode 10, the capacitor 13, and the base-driving winding 14, constitute a primary side of a ringing choke converter.

Further, similar to the construction of FIG. 1, in the secondary side of the transformer 15, two secondary windings 19 and 22 and two additional windings 16 and 26 are provided. To each of the windings 16, 19, 22, and 26 in the secondary side, a rectifying and smoothing circuit comprised of a diode (17, 20, 24, or 25) and a capacitor (18, 21, 23, or 27) is connected.

In the secondary side, the secondary winding 19 and the rectifying and smoothing circuit (20, 21) which is connected to the secondary winding 19, are provided to supply the output therefrom for generating a positive-voltage component of the ringing signal, and the secondary winding 22 and the rectifying and smoothing circuit (23, 24) which is connected to the secondary winding 22, are provided to supply the output therefrom for generating a negative voltage component of the ringing signal. To generate the AC ringing signal, an invertor circuit is provided in the output side of the rectifying and smoothing circuits (20, 21) and (24, 23). The invertor circuit is comprised of the output control transistors 28 and 32. The output control transistors 28 and 32 are respectively controlled by the phototransistors 29 and 33, and the phototransistors 29 and 33 respectively receive a power supply from the additional windings 16 and 26 through the rectifying and smoothing circuits (17, 18) and (25, 24).

In the primary side, first, the current from the DC voltage source 3 is supplied through the resistor 1 to the base terminal of the switching transistor 4. Therefore, the switching transistor 4 becomes ON, i.e., a current flows in the circuit which is formed by the DC voltage source 3, the primary winding 2, and the switching transistor 4. Accordingly, a voltage is generated in the primary winding 2, and at the same time, a voltage is generated in the base-driving winding 14. The increased voltage of the base-driving winding 14 further increases the collector-emitter current in the switching transistor 4. When the collector-emitter current is so increased that the switching transistor 4 goes out of a saturation state, the collector-emitter voltage in the switching transistor 4 increases, and accordingly, the voltage in the primary winding 2 is decreased, and the voltage in the base-driving winding 14 is decreased. The decreased voltage in the base-driving winding 14, decreases the base current of the switching transistor 4, and accordingly, the collector-emitter voltage in the switching transistor 4 is further increased, and accordingly, the voltage in the primary winding 2 is decreased, and the base current of the switching transistor 4 is further decreased, and finally, the switching transistor 4 is made OFF.

While the current flows in the primary winding 2, no current flows in the windings 16, 19, 22, and 26 in the secondary side because the diodes 17, 20, 24, and 25 are respectively connected in a direction opposite to the direction of a voltage in the windings 16, 19, 22, and 26 in the secondary side which is generated responding to the above current flow in the primary winding 2. When the switching transistor 4 changes from the ON state to the OFF state as explained above, the current in the primary winding 2 is stopped, a voltage in a direction opposite to the direction of the voltage generated when the switching transistor 4 is ON, is generated in each of the windings 16, 19, 22, and 26 in the secondary side, and the base-driving winding 14. Thus, a direct current is output from the above-mentioned rectifying and smoothing circuit which is connected to each of the windings 16, 19, 22, and 26 in the secondary side. When all the energy held in the transformer 15 is transferred to the secondary side, the voltages of all the windings of the transformer 15 become zero, and thus, the current from the DC voltage source 3 is supplied through the resistor 1 to the base terminal of the switching transistor 4, and thereby the switching transistor 4 becomes ON again.

The emitter of the base-current control transistor 6 is connected to the base terminal of the switching transistor 4, and the base terminal of the base-current control transistor 6 is connected to the base terminal of the switching transistor 4 through the resistor 7, and is connected to the emitter terminal of the switching transistor 4 through the Zener diode 10 and the resistor 11. When the voltage of the base of the switching transistor 4 is too high, the Zener diode 10 breaks through, and the current flows from the emitter to the collector of the base-current control transistor 6, and thus, the base current of the switching transistor 4 is decreased. Therefore, the base current of the switching transistor 4 is controlled by the above provision including the base-current control transistor 6 and the Zener diode 10.

The capacitor 13 is connected in parallel to the base-driving winding 14, and is charged by the above opposite voltage generated in the base-driving winding 14 while the switching transistor 4 is OFF. A series connection of the resistors 11 and 12 is connected in parallel to the capacitor 13. The charged voltage in the capacitor 13 is divided in the series connection of the resistors 11 and 12, and the current from the above charged capacitor 13 is supplied to the base of the base-current control transistor 6 through the Zener diode 10. In addition, a current from the base-driving winding 14 corresponding to the opposite voltage is supplied to the base of the switching transistor 4 through the diode 5.

In the secondary side, similar to the construction of FIG. 1, the secondary winding 19 and the rectifying and smoothing circuit (20, 21) which is connected to the secondary winding 19, are provided to supply the output therefrom for generating a positive-voltage component of the ringing signal, and the secondary winding 22 and the rectifying and smoothing circuit (23, 24) which is connected to the secondary winding 22, are provided to supply the output therefrom for generating a negative voltage component of the ringing signal. To generate the AC ringing signal, an invertor circuit is provided in the output side of the rectifying and smoothing circuits (20, 21) and (24, 23). The invertor circuit is comprised of the output control transistors 28 and 32. The collector of the output control transistor 28 is connected in series to the high-voltage-side output terminal of the rectifying and smoothing circuit (20, 21), and the emitter of the other output control transistor 28 is connected in series to the low-voltage-side output terminal of the rectifying and smoothing circuit (23, 24). The emitter of the output control transistor 28 and the collector of the output control transistor 32 are connected to make a common terminal A, and the high-voltage-side output terminal of the rectifying and smoothing circuit (20, 21) and the low-voltage-side output terminal of the rectifying and smoothing circuit (23, 24) are made a common terminal B. The ringing signal of an AC voltage 75 V and a frequency 20 Hz is output from the terminals A and B.

To drive the output control transistors 28 and 32, the emitter terminals of the phototransistors 29 and 33 are respectively connected to the base terminals of the output control transistors 28 and 32. The collector terminals of the phototransistors 29 and 33 are respectively connected to the high-voltage-side output terminals of the rectifying and smoothing circuits (17, 18) and (25, 27). The emitter terminal of the phototransistor 29 is connected to the low-voltage-side output terminal of the rectifying and smoothing circuits (17, 18) through the resistor 31, and the emitter terminal of the phototransistor 23 is connected to the low-voltage-side output terminal of the rectifying and smoothing circuit (25, 27) through the resistor 35. The base terminals of the phototransistors 28 and 32 are respectively connected to thier own emitters. Namely, the additional windings 16 and 26 are respectively provided for supplying power to the phototransistors 29 and 33.

The phototransistors 29 and 33 are respectively driven by light emitted from the photodiodes 50 and 49 in a control circuit, and the phototransistors 50 and 49 alternately emit light responding to positive and negative voltage components of an analog AC output current having a frequency of 20 Hz from the oscillator 48. Thus, the output control transistors 28 and 32 are alternately driven responding to the AC outputs of the oscillator 48 through the photodiodes 50 and 49 and the phototransistors 29 and 33.

According to the present invention, the output terminals of the rectifying and smoothing circuit (17, 18) are connected by a series connection of the resistor 56, the photodiode 57, the Zener diode 58, and the photodiode 59. The voltage between the output terminals of the rectifying and smoothing circuit (17, 18) is, for example, 17 V. When the voltage of the high-voltage-side output terminal of the rectifying and smoothing circuit (17, 18) is normal, i.e., the voltage of the high-voltage-side output terminal of the rectifying and smoothing circuit (20, 21) is normal, no currents flow through the Zener diode 58, and neither of the photodiodes 57 and 59 emits light. When the voltage of the high-voltage-side output terminal of the rectifying and smoothing circuit (17, 18) exceeds a predetermined voltage, i.e., the voltage of the high-voltage-side output terminal of the rectifying and smoothing circuit (20, 21) exceeds a predetermined voltage, the Zener diode 58 breaks down, and a current flows through the above series connection, and therefore, light is emitted from each of the photodiodes 57 and 59..

The light emitted from the photodiode 57 is received in the photothyristor 52 in the primary side. In the primary side, the collector of the transistor 51 is connected to the base of the switching transistor 4 to turn the switching transistor 4 OFF and stop the power supply to the secondary side, and the emitter of the transistor 51 is connected to the low-voltage-side of the voltage source 3. A series connection of the photothyristor 52 and the resistors 55 and 62 is connected between both the terminals of the voltage source 3, and the connecting point between the photothyristor 52 and the resistor 55 is connected to the base of the transistor 51. When receiving the above light from the photodiode 57, the photothyristor 52 becomes ON, a current is supplied to the base of the transistor 51, and the transistor 51 becomes ON. Therefore, the base voltage of the switching transistor 4 becomes low, and the switching transistor 4 is turned OFF. Thus, when an overvoltage is detected in the output in the secondary side, the power supply from the primary side is stopped. Therefore, damage due to a load of the overvoltage in the circuit component in the path of the ringing signal in the subscriber circuit, can be avoided.

Further, similar to the conventional construction of FIG. 1, the construction comprised of the phototransistor 61, the resistors 37, 41, 42, and 44, the capacitor 43, the Zener diode 45, the transistors 40 and 46, the relay circuit 47, and the relay switch 70, is provided for generating an alarm signal when an overvoltage is detected in the output of the ringing signal. The above-mentioned light emitted from the photodiode 59 is received in the phototransistor 61. The connecting point between the phototransistor 61 and the resistor 37 is connected to the base terminal of the transistor 40. The construction comprised of the resistors 41, 42, and 44, the capacitor 43, the Zener diode 45, the transistors 40 and 46, the relay circuit 47, and the relay switch 70, is the same as the construction in FIG. 1. When the phototransistor 61 receives the above light from the photodiode 59, the voltage of the connecting point between the phototransistor 61 and the resistor 37, i.e., the voltage of the base of the transistor 40 becomes high. Then, no current flows in the relay circuit 47, and correspondingly the relay switch 70 becomes ON, i.e., an alarm signal is output.

I claim:

1. A ringing signal generation circuit, comprising:
   a direct current power source for generating a direct current voltage;
   a transformer, comprising a primary winding and a base-driving winding in a primary side, a secondary winding in a secondary side, and an additional winding;
   a control transistor, connected in series to said primary winding and said direct current power source, for controlling a current flowing in said primary winding;
   rectifying and smoothing means for rectifying and smoothing a current generated in said secondary winding;
   an additional rectifying and smoothing means for rectifying and smoothing a current generated in said additional winding;
   inverter means for converting a direct current output of said rectifying and smoothing means into an alternating current;
   inverter controlling means for controlling said inverter means;
   overvoltage detecting means for detecting an overvoltage in said secondary winding, said overvoltage detecting means including means for detecting an overvoltage in the output of said additional winding to indirectly detect said overvoltage in said secondary winding; and
   current supply stopping means for stopping a supply of the current to said primary winding in response to the detecting of the overvoltage by said overvoltage detecting means.

2. A ringing signal generation circuit according to claim 1, wherein said current supply stopping means includes means for turning said control transistor off when said overvoltage is detected.

3. A ringing signal generation circuit according to claim 1, wherein said overvoltage detecting means comprises a Zener diode which breaks through when said overvoltage is detected.

4. A ringing signal generation circuit according to claim 3, wherein said overvoltage detecting means further comprises a light-emitting device which is connected with said Zener diode, and emits light when the Zener diode breaks through.

5. A ringing signal generation circuit according to claim 4, wherein said current supply stopping means comprises a light-receiving device which is operative to receive light emitted from said light-emitting device, and passes a current to turn said control transistor off when said light is emitted from said light-emitting device.

6. A ringing signal generation circuit according to claim 1, wherein said inverter means comprise an output control transistor to control an output current of said rectifying and smoothing means.

7. A ringing signal generation circuit according to claim 6, wherein said inverter controlling means comprises an oscillator to generate a ringing control signal, and a control light emitting means for emitting a control light corresponding to said ringing control signal.

8. A ringing signal generation circuit according to claim 7, wherein said inverter means further comprises an output-control light-receiving means for receiving the control light which is emitted from said control light emitting means, and for supplying a control current to control said output control transistor corresponding to said control light.

9. A ringing signal generation circuit according to claim 4, further comprises:
   an overvoltage alarm means for outputting na alarm when said overvoltage is detected, and
   a light-receiving means for receiving said light emitted from said light-emitting device, and for passing a current to make said overvoltage alarm means output the alarm when said light is emitted from said light-emitting device.

10. A ringing signal generation circuit, comprising:
    a direct current power source for generating a direct current voltage;
    a transformer, comprising a primary winding and a base-driving winding in a primary side, and a secondary winding in a secondary side;
    a control transistor, connected in series to said primary winding and said direct current power source, for controlling a current flowing in said primary winding;
    rectifying and smoothing means for rectifying and smoothing a current generated in said secondary winding;
    inverter means for converting a direct current output of said rectifying and smoothing means into an alternating current;
    inverter controlling means for controlling said inverter means;
    overvoltage detecting means for detecting an overvoltage in said secondary winding; and
    current supply stopping means for stopping a supply of the current to said primary winding in response to the detecting of the overvoltage by said overvoltage detecting means, said current supply stopping means comprising base current drawing-off means, connected to a base terminal of said control transistor, for drawing off a base current supplied to the base terminal of said control transistor in response to the detecting of the overvoltage by said overvoltage detecting means.

* * * * *